United States Patent Office 3,697,293
Patented Oct. 10, 1972

3,697,293
METHOD OF MAKING COTTAGE CHEESE
Kenneth R. Breidenstein, Winlock, Wash., assignor to Kraftco Corporation, New York, N.Y.
No Drawing. Filed Sept. 26, 1969, Ser. No. 861,484
Int. Cl. A23c 19/02
U.S. Cl. 99—116
4 Claims

ABSTRACT OF THE DISCLOSURE

The present invention relates to an improved dairy product and is particularly directed to cottage cheese. The invention involves a method for manufacturing a cottage cheese having an extended shelf life. The method of the invention relates to the heating of cottage cheese while being transported to a packaging station. During such transport the cheese curd is heated to a temperature of at least about 130° F.

---

The present invention relates to a method for making a dairy product from media containing milk solids and more particularly, it relates to an improved method for the manufacture of cottage cheese whereby an improved product is provided.

Media containing milk solids, such as whole milk or skim milk, have long been used to produce various protein products, such as cheese. Cottage cheese is a particular example of a product produced from a medium containing milk solids and includes steps typically found in cheese-making. A typical commercial cottage cheese make procedure is as follows:

Inoculation.—Pasterized skim milk is mixed with a suitable starter culture, such as lactic acid starter culture, rennet is also usually added in order to facilitate setting of the milk.

Setting.—The milk is allowed to set. In this period, acid is developed in the milk because of the action of the starter culture. The setting period will normally be more than four hours and setting will usually be accomplished at a temperature of from 85° F. to 92° F., which temperature facilitates growth of the starter culture organisms. Longer setting periods have been employed, for example, 12 to 16 hours, at a temperature of 70° F. to 80° F. with smaller amounts of lactic acid starter culture.

Cutting.—After the curd is set, that is, when a coagulum is formed, the coagulum is cut into small pieces, usually of cube shape, which are referred to as curd. Conventionally, the curd is cut when the acidity of the whey is approximately .50 percent or above, when titrated against .1 N NaOH, although lower cutting acids have been employed. Upon cutting, the curd and whey commence to separate.

Cooking.—The curd is then cooked in the whey with careful stirring. Cooking is usually carried out until the temperature of the whey is between about 120° F. and 140° F. Cooking is carried out until a "cooked curd" is provided. This curd has a particular characteristic which is well recognized by the cheesemaker. In general, the curd particles will not coalesce or stick together after cooking, and will readily separate even after application of substantial pressure. The characteristics of cooked curd are well known.

Whey Separation.—The whey is drained from the curd.

Washing.—After the whey is separated from the curd, the curd is subjected to several washings with cool water. After final washing, the curd is again drained.

During the cooking and washing step the curd develops additional acidity and expels whey. Also, the curd becomes more firm during these steps.

The curd is now in substantially finished form and may be packed in containers for storage and for shipping. It is customary to add a cooled creaming mixture to the curd to make a creamed curd prior to packaging.

The cottage cheese, before addition of cream, usually has an acidity sufficient to provide a pH of between about 4.6 to 4.7. The uncreamed cottage cheese curd usually has between about 71.5 percent and about 80 percent by weight of moisture, between about 12.5 percent and about 21 percent protein, between about 0.3 percent and about 0.6 percent fat and between about 0.2 percent and about 0.7 percent of salt-free ash.

Cottage cheese is packaged in tubs and has relatively short shelf life. It must be used by the consumer relatively promptly.

Various methods have been used to improve certain features of cottage cheese manufacture. For example, in United States Letters Patent No. 3,117,870 to Hussong et al. there is disclosed a method for substantially increasing the shelf life of cottage cheese by packaging the curd while hot. In the method, skim milk, which is to be used in the manufacture of cottage cheese, is subjected to high temperature treatment to effect at least about 40 percent denaturation of the serum protein of the milk. The skim milk is then set to form cottage cheese curd and whey, and the curd is cut at an acidity below that of conventional cottage cheese make procedures. Thereafter, the curd is subjected to heat treatment that is equivalent to a heat treatment at a temperaure of about 130° F. for at least about 45 minutes. The drained curd is then creamed and packaged into containers while the curd is maintained at a temperature of at least about 130° F. The heat treatment of the curd in accord with the Hussong et al. patent is effected while the curd is in the whey, or it may be caried out after the whey is drained by washing the curd with hot water. The method of the Hussong et al. patent effects increased shelf life of cottage cheese.

The Hussong et al. patent is an important advance in cottage cheese. However, it is desirable to provide a method for manufacturing cottage cheese which can provide further increase in shelf life in a simple and economical manner. In this connection, it is desirable to provide a method for making cottage cheese whereby heat treatment may be effected at conditions which are greater than those equivalent to a heat treatment at a temperautre of about 130° F. for at least about 45 minutes.

Accordingly, it is the principal object of the present invention to provide an improved process for the manufacture of cheese curd and particularly cottage cheese curd. A more particular object of the present invention is to provide an improved process for the manufacture of cottage cheese wherein the cottage cheese curd is heated to an elevated temperature. A still further object of the present invention is to provide an improved process for the manufacture of cottage cheese which is simple and economical to practice and which results in cottage cheese having an extended shelf life.

Other objects and advantages of the present invention will be apparent from the following detailed description.

In general, in the practice of the invention, a medium containing milk protein is provided. The serum protein may be denatured to various degrees in accord with the teachings of the art. Sufficient acid is then established in the media to cause a coagulum to be formed. The coagulum is divided to yield coalescent protein and serum. As used herein, the term "serum" refers to the liquid from which the protein has been removed and is generally referred to as "whey." The coalescent protein is maintained in an unmatted state and is heat-conditioned to a desired extent The heat conditioning is such that the coalesced protein shrinks somewhat and the coalesced protein is partially firmed to provide an uncooked curd. The heat conditioning may be effected in whey or wash water, but is such that the temperature of the curd does not at any time exceed about 140° F. It is important that this heat conditioning be restricted or an unsatisfactory cottage cheese will result. The curd is thereafter subjected to a further heat treatment while being transported so as to increase the temperature of the curd above about 145° F.

The medium containing milk protein most commonly used in the manufacture of cottage cheese is skim milk. Skim milk is usually obtained from whole milk which has the milk fat removed therefrom. The resulting solids level of the skim milk is usually from about 8 to about 10 percent. The skim milk may be fortified with added milk protein by the addition of milk solids or concentrated skim milk. Other media containing milk protein whch are suitable for the practice of the invention include reconstituted non-fat milk solids, and skim milk fortified with non-fat milk solids. The solids level of the medium may be from about 8 percent to about 12 percent. Hereinafter, certain features of the present invention will be described with particular reference to skim milk as the medium containing milk protein.

The skim milk is either subjected to relatively low heat conditions to effect pasteurization, or to high temperature heat treatment to effect at least partial denaturation of the serum protein of the skim milk as well as pasturization. High temperature heat treatment, if used, is usually such that more than about 40 percent of the serum protein is denatured. Such denaturation can be accomplished by holding skim milk at 200° F. for 40 seconds; at 260° F. for 12 seconds; or at 300° F. for no-hold time. The treatment conditions for effecting the desired denaturation are now familiar to those skilled in the art, and may be practiced in various pieces of commercially available equipment.

In the practice of the invention, the skim milk, whether having been heat treated by pasteurization or high temperature heat treatment, is then acidified. The acidification may be effected by various methods. The usual means of effecting acidification is to inoculate the skim milk with a suitable bacterial culture capable of producing acid in the skim milk. However, acidification may be effected by the direct introduction of an edible acid or an acidogen into the skim milk.

Acid is established in the skim milk at a pH sufficient to cause the formation of a coagulum which can be cut. In this connection, the isoelectric point of raw skim milk or skim milk which has been subjected to pasteurization heat treatment occurs at a pH of about 4.65. The isoelectric point of skim milk which has been subjected to high temperature heat treatment to denature at least about 40 percent of the protein of the skim milk has an isoelectric point of about pH 4.85.

The isoelectric point of the skim milk is commonly measured by the A-C test. In the A-C test, skim milk which is to be used in making cottage cheese is inoculated with a starter culture. A portion of the inoculated skim milk is retained in a small metal beaker or cup which rests in the main body of the warm skim milk. The curd which eventually forms in the metal beaker is continually sliced with a spatula. The slicing or cutting of the whey is repeated until fine lines or beads of whey are observed along the cuts. These lines are considered to occur at the isoelectric point of the skim milk, and this is usually considered by cheesemakers to be the optimum pH for cutting of the curd.

Cutting of the curd is not commenced until the pH of the curd has dropped sufficiently to cause the formation of a coagulum which can be cut. The cutting of curd obtained from skim milk given high temperature heat treatment will normally be started when the pH has fallen to a pH from about 5.0 to about 4.4. The acidity should be developed to provide a curd which is not too soft or fragile.

Thereafer, the curd is heat conditioned in the whey. The temperature of the whey is gradually increased over a period of about two hours as the curd is carefully stirred in the whey. The heating is restricted so that the temperature of the curd does not exceed about 130° F. In this connection, the heat conditioning of the curd must be sufficient to establish curd firmness which is sufficient to enable the curd to be handled during the subsequent washing steps. However, the firming of the curd should be restricted to a level which is less than about 60 percent of the final curd firmness desired. Additional curd firmness is subsequently developed during washing of the curd and by subjecting the curd to heating while being transported, as will be described more fully hereinafter. It is important to note that this heat conditioning is less than the usual cooking of curd in the normal cottage cheese make procedure.

The firmness of the curd may be determined by utilization of a firmness test. The firmness of the curd is measured by placing a curd particle at the bottom of a cylindrical tube and by dropping weights onto the particle from known heights. The relationship between the weight and the height required to shatter the curd particle may be used to measure the firmness of the particle, which may be expressed in dynes. The final firmness of the curd is adjusted by subsequent steps of the present invention.

Additional acid may be established while the curd particles are maintained in the whey during the heat conditioning step. In general, the longer the time in which the curd particles remain in the whey after additional acid is provided, the easier the separation of the whey will be and the more rapid will be the development of curd firmness during subsequent steps. For skim milk, it is preferred to establish a whey acidity of from about .51 to about .56 percent equivalent lactic acid. The whey may then be partially or substantially completely separated by a suitable procedure, such as by transporting the curd and whey to a drain table provided with a screened outlet which retains the curd while permitting the whey to be drained. It is desirable to maintain a blanket of whey over the curd particles. Therefore, the whey is drained only to that point where the level of whey is at or above the level of curd particles.

After draining the whey, washing of the curd may then be effected by adding wash water thereto. The wash water may be heated prior to its addition to the curd. It is preferred that the temperature of the wash water be less than about 130° F. If the wash water is heated to above about 130° F., firming of the curd occurs to an undesirable extent, and the subsequent heat treatment step of the present invention provides a curd which is too firm. If the wash water is at a temperature of less than about 90° F., the heat conditioning of the curd in the whey should be prolonged to provide additional firmness. Regardless of the firming effected by the addition of wash water, i.e., whether the wash water is heated or non-heated, the firmnessof the curd after the washing step is preferably from about $.50 \times 10^{-3}$ dynes to about $80 \times 10^{-3}$ dynes and must be less than about 80 percent of the firmness desired in the final curd product.

It can be readily seen that the various steps of the present invention for the manufacture of cottage choose are flexible and may be readily adjusted with respect to each other so as to provide the desired curd firmness at the time that the washing step is finished. That is, the acidity at which the cutting of the curd is started, the development of acidity while the curd is in the whey, the heat conditioning of the curd in the whey, and further heat conditioning of the curd in the wash water are all interrelated and may be adjusted within the limits set forth above to provide a curd which has less than about 80 percent of the curd firmness desired in the final curd product at the time of the final heat treatment step of the present invention. The firmness of the curd prior to the final heat treatment should be sufficient to maintain the curd without undue fracturing of the curd, but should be below the limit set forth above.

Multiple washings of the curd may be used at the discretion of the manufacturer of the cottage cheese. After the final washing, the wash water is drained from the curd and the curd may be creamed with a suitable creaming mixture. In this connection, various known creaming mixtures may be used in the practice of the present invention to effect creaming of the curd. The creaming mixture may be heated prior to addition to the curd. The creaming mixture may be added at various temperatures, but should preferably provide an equilibrium temperature of curd and creaming mixture of less than about 140° F.

Thereafter, the curd is creamed and heat treated in accordance with the invention to provide a heated curd which may be packaged. Heating of the curd is effected while the creamed curd is being transported from the drain table to packaging equipment. Transporting of the creamed curd may be effected by any suitable means, such as by pumping the curd through a pipe. Preferably, the heating of the creamed curd is effected by injecting steam into a flowing stream of the curd. The temperature of the creamed curd is raised by the heating step to at least about 130° F. The temperature may be raised up to about 170° F.

Heating substantially above 170° F. gives undesired effects such as over firming and off-flavors. As indicated, steam injection is the preferred method of heating the curd because of the rapidity with which the heating of the curd may be effected.

The injection of the steam into the curd may be effected by various means. It is preferred to provide a nozzle for injection of steam into the curd wherein the full force of the steam is not directly impinged upon the curd particles, so as to prevent shattering of the curd particles. This may be effected by introducing the steam into a nozzle which has a plurality of outlets. The shape of the outlets is not critical, and may be various desired shapes, such as circular. If the increase in temperature to be effected on the curd by the injection of steam is relatively small, i.e., no more than about 10 degrees of temperature elevation, the steam may be low pressure steam of 15 p.s.i.g. or less. If the temperature increase of the curd is more than about 10° F., high pressure steam of greater than 15 p.s.i.g. is preferred. In general, the higher the degree of superheat of the steam, the less the condensate that occurs in the curd.

After increasing the temperature of the creamed curd by steam injection or other suitable means, the curd, now at a temperature of at least about 130° F., is packaged into suitable containers. The increase in temperature of the curd effects desired final firming of the curd and provides a heated curd which may be packaged while hot and which provides extended shelf life. In this connection, the time at which the curd remains at the elevated temperature effects both the final curd firmness and the shelf life properties of the creamed curd. It is preferred that the final curd firmness be in the range of from about $90 \times 10^{-3}$ dynes to about $110 \times 10^{-3}$ dynes. Curd firmness within this range and desirable shelf life properties are obtained when the temperature of the curd in the package is maintained within the range of from about 130° F. to about 170° F. for a period of time of from about 30 minutes to about 3 minutes, the time being inversely proportional to the temperature. Thereafter, the curd is cooled. No particular cooling cycle is required, however, it is preferred to reduce the temperature of the curd to less than 120° F. within 60 minutes after holding at the desired temperature.

The method of the invention provides a flexible easily controlled process for the manufacture of cottage cheese that does not require skilled labor.

The following example further illustrates features of the invention, but is intended to in no way limit the scope of the invention, which is defined in the appended claims.

EXAMPLE I

Two hundred gallons of natural skim milk, containing 8.8 percent solids, was used to make cottage cheese. The skim milk was first heat treated at a temperature of 238° F. for 34 seconds, which effected about 73 percent dennaturation of the serum protein. The skim milk was introduced in a vat at 95° F. and a *Streptococcus lactis* starter was added. The skim milk was maintained at a temperature of 90° F. to provide a suitable environment for the starter. When an acidity of .48 percent equivalent lactic acid, corresponding to a pH of 4.6, had been obtained, a coagulum had formed, and cutting of the coagulum was started. The coagulum was cut into quarter-inch cubes with conventional cottage cheese knives. The curd thus formed was permitted to remain in the whey at a temperature of 90° F. until an aciditiy of .54 percent equivalent lactic acid had been obtained. The whey was then drained from the curd until the whey reached a level of one inch above the top of the curd particles. This was equivalent to draining about 60 percent of the total free whey.

Water which had been heated to a temperature of 130° F. was then added to the curd in an amount sufficient to provide a mixture of curd and water substantially equivalent to the level of skim milk originally present. The curd was maintained in suspension in the water for a period of about 30 minutes, at which time the temperature of the curd was 121° F. The firmness of the curd particles at this time was $69 \times 10^{-3}$ dynes, as determined by the test previously described, and was less than 70 percent of the final curd firmness.

The water was then drained until the level of the liquid in the vat was about one inch above the level of the curd particles. Water, which had been heated to 130° F. was again added at a level sufficient to provide a volume half that of the original level of skim milk in the tank. The curd particles remained in this second wash water for a period of 30 minutes. At this time the curd particles had reached a temperature of 128° F. and the firmness was $87 \times 10^{-3}$ dynes. The water was then fully drained from the curd.

A creaming mixture at a temperature of 145° F. was then added to the curd to provide a creamed cottage cheese product. The equilibrium temperature of the product, after the creaming mixture was added and blended with the curd, was 125° F. The firmness of the curd at this time was $121 \times 10^{-3}$ dynes.

The curd, immediately after the creaming mixture had been added and blended, was pumped through a line containing a steam injection nozzle. The steam injection nozzle contained four outlet points for the injection of steam into the flowing stream of creamed cottage cheese. The steam was added at a level sufficient to increase the temperature of creamed cottage cheese to 145° F. The hot cottage cheese was then packaged into containers. After 10 minutes, the containers were transferred to a cooler and were cooled and maintained at a temperature of 40° F. The temperature of the creamed curd was below 50° F. in less than 24 hours. The firmness of the creamed curd was $104 \times 10^{-3}$ dynes 24 hours after the packaging of the creamed curd. The total time required to produce the creamed cottage cheese from the time that the skim milk was introduced into the vat until the creamed cottage cheese was packaged was 9 hours.

The cottage cheese produced by the above method was judged to be of excellent quality. It remained of good quality for a period of 8 weeks while stored at a temperature of 45° F.

It will be readily apparent to one skilled in the art that the variable of the present invention, including the cutting acidity, temperature of heating of curd in the whey, temperature of the wash water and temperature of the creaming mixture, are variable but related in the practice of the present invention. It is recognized that certain disclosures made herein may be within the prior art. However, it is believed to be a novel departure from the prior art to effect heating of curd by rapid heat exchange while the curd is being transported and immediately prior to packaging of the curd, and to provide the curd at a curd firmness level of less than about 60 percent of the final curd firmness prior to the final heating step.

The above-described process provides a method for making protein products from protein suspensions, which is considerably more flexible than prior art procedures. The process permits manufacture of products which have long shelf life with desired texture and quality in a reduced period of time.

The various features of the invention believed to be new are set forth in the following claims.

It is claimed that:

1. An improved method for making cottage cheese comprising making a coagulum, cutting the coagulum to provide a particulate cottage cheese curd and whey, heat conditioning said curd in the whey under conditions less than cooking conditions, transporting said curd which has been separated from the whey, heating said curd injection of steam into the curd during said transport and immediately prior to packaging to a temperature of within the range of from about 130° F. to about 170° F. and packaging said curd while at a temperature within said range, said curd being held in said package at a temperature within said range for a period sufficient to provide cottage cheese having the desired level of firmness, said curd firmness prior to said steam injection being less than about 80 percent of the desired curd firmness.

2. The method of claim 1 in which the curd is creamed prior to transport.

3. The method of claim 1 in which the coagulum is prepared from skim milk and is heat treated to denature at least 40 percent of the serum protein.

4. The method of claim 1 in which the heat conditioning firms the curd to a level which is less than 60 percent of the final curd firmness.

References Cited

UNITED STATES PATENTS

| | | | |
|---|---|---|---|
| 3,117,870 | 1/1964 | Hussong et al. | 99—116 |
| 3,394,011 | 7/1968 | Richardson et al. | 99—116 |
| 3,449,127 | 6/1969 | Budahn | 99—116 X |

OTHER REFERENCES

Manual for Dairy Manufacturing Short Courses, Dairy Manufacturing Division, The Pennsylvania State University. Litho Kurtz Bros., Clearfield, Pa., 1956 (p. 82).

A. LOUIS MONACELL, Primary Examiner

D. M. NAFF, Assistant Examiner